United States Patent [19]

Ladouceur

[11] Patent Number: 5,020,950

[45] Date of Patent: Jun. 4, 1991

[54] RIVETING FASTENER WITH IMPROVED TORQUE RESISTANCE

[75] Inventor: Harold A. Ladouceur, Livonia, Mich.

[73] Assignee: Multifastener Corporation, Detroit, Mich.

[21] Appl. No.: 489,437

[22] Filed: Mar. 6, 1990

[51] Int. Cl.$^5$ .............................................. F16B 39/00
[52] U.S. Cl. ...................................... 411/107; 411/179
[58] Field of Search ............... 411/107, 177, 179–181; 29/524.1, 525.2

[56] References Cited

U.S. PATENT DOCUMENTS

| | | | |
|---|---|---|---|
| 1,332,687 | 3/1920 | Reynolds | 411/179 X |
| 3,213,914 | 10/1965 | Baumle et al. | 411/179 |
| 3,253,631 | 5/1966 | Reusser | 411/179 |
| 3,358,727 | 12/1967 | Hughes | 411/180 |
| 3,958,389 | 5/1976 | Whiteside et al. | 29/525.2 X |
| 4,389,766 | 6/1983 | Capuano | 411/179 |
| 4,430,034 | 2/1984 | Fujikawa | 411/179 |
| 4,432,681 | 2/1984 | Capuano | 411/180 |
| 4,543,023 | 9/1985 | Capuano | 411/180 |
| 4,637,766 | 1/1987 | Milliser | 411/180 |
| 4,708,556 | 11/1987 | Pamer et al. | 411/179 |

Primary Examiner—Rodney M. Lindsey
Assistant Examiner—Jerry Redman
Attorney, Agent, or Firm—Dykema Gossett

[57] ABSTRACT

A riveting fastener and panel assembly having improved torque resistance. The riveting fastener includes a tubular riveting barrel portion having a free end and a body portion having a diameter greater than the barrel portion. The tubular barrel portion is received through an opening in a panel and preferably deformed radially outwardly, and the body portion is driven into the panel adjacent the panel opening deforming the panel. The improvement comprises a plurality of spaced cavities in the body portion preferably having an arcuate inside surface opening radially outwardly with the opening to the cavities having an area greater than the inside surface area of the cavity. The panel is permanently deformed into the cavities as the body portion is driven into the panel, thereby forming a mechanical interlock between the body portion and the panel preventing relative rotation of the riveting fastener in the panel assembly.

17 Claims, 2 Drawing Sheets

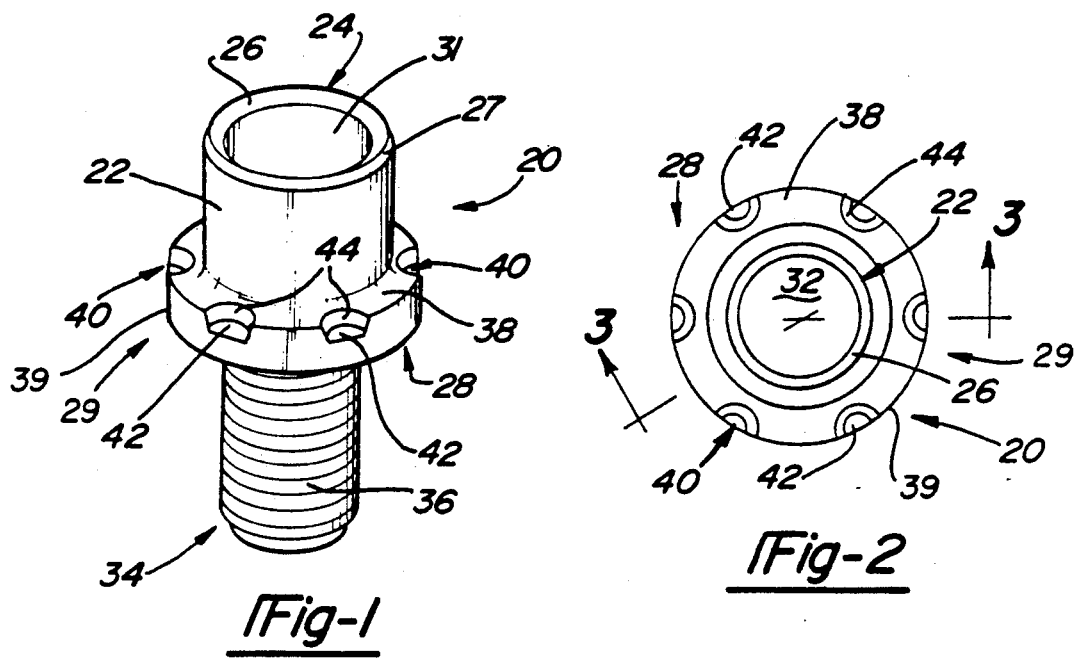
Fig-1
Fig-2
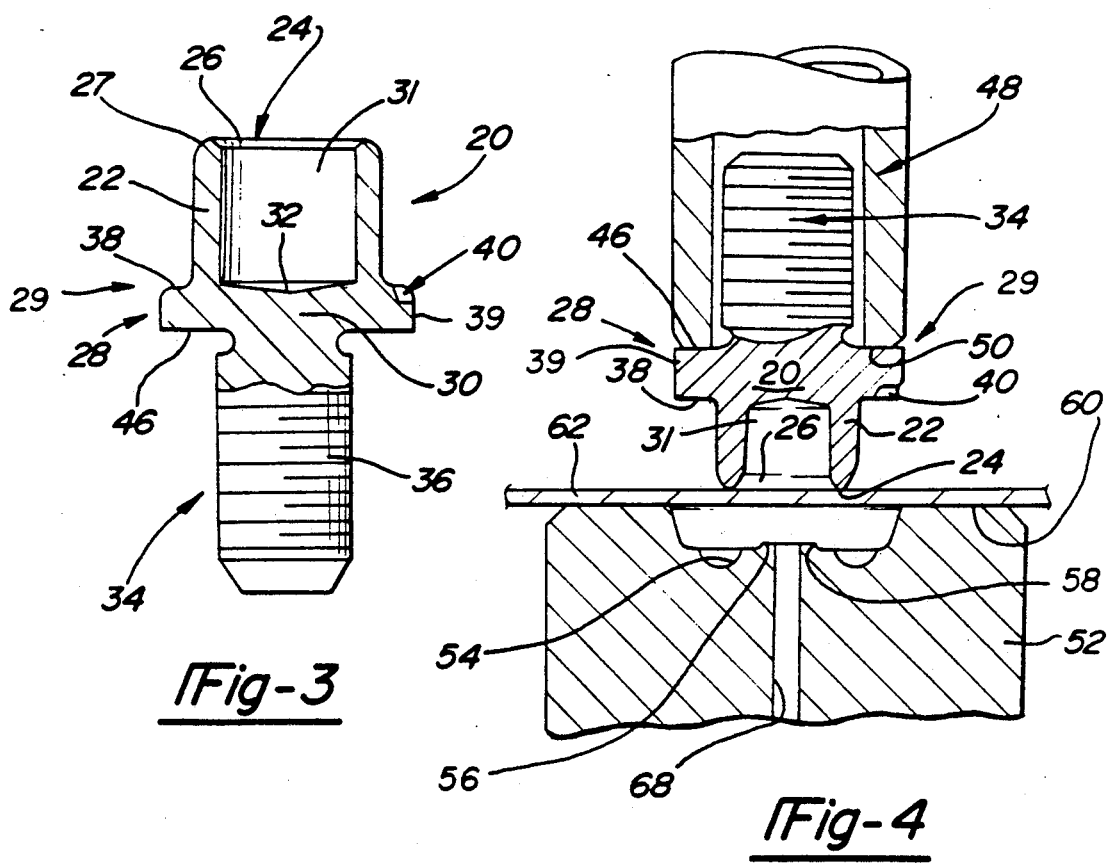
Fig-3
Fig-4

RIVETING FASTENER WITH IMPROVED TORQUE RESISTANCE

BACKGROUND OF THE INVENTION

Riveting fasteners are commonly used in mass production applications. In applications where the rivet is also a fastener, such as an externally threaded bolt, anti-rotation or torque resistance means are typically provided, particularly in mass production applications. In automotive applications, for example, the riveted fastener must be able to withstand the torque of an air gun or pneumatic driver. The torque the fastener must withstand without loosening will, however, depend upon the particular application and the size of the fastener.

In a stud-type "PIERCEFORM" fastener, for example, as disclosed in U.S. Pat. No. 4,555,838, assigned to the assignee of the present application, an 8 mm bolt must be able to withstand 24 to 34 N.M. (Newton meters). A 10 mm bolt must be able to withstand a torque of 50 to 70 N.M. in automotive applications. 70 N.M. is equal to about 52 foot pounds. During assembly, the air gun or pneumatic driver is generally set at about 70 N.M. to threadably attach a nut on a 10 mm "PIERCEFORM" bolt. Therefore, if the bolt does not withstand a torque of 70 N.M., the self-riveting bolt will be twisted in the panel, destroying the assembly.

The self-riveting fasteners of the type described herein include a body portion and an integral tubular barrel portion having a circumference less than the body portion. The barrel portion is preferably driven into the panel as the barrel portion is riveted to the panel. In a stud-type "PIERCEFORM" fastener, the body portion preferably includes a radial surface or flange and a stud portion integrally joined to the body portion extending in coaxial alignment with the barrel portion, as disclosed in the above-referenced U.S. Pat. No. 4,555,838. More commonly, anti-rotation protrusions or nubs are provided either on the barrel portion, adjacent the body portion, or on the flange portion adjacent the barrel portion as disclosed, for example, in FIG. 1 of U.S. Pat. No. 4,810,143, also assigned to the assignee of the present application.

Although they are somewhat effective in resisting rotation, these anti-rotation protrusions or nubs create stress risers in the panel and reduce the thickness of the panel which may result in failure of the fastener and panel assembly, particularly under torque in mass production applications. As stated above, where the riveting fastener is a stud-type fastener, a nut is normally driven onto the threaded stud by a pneumatic driver. However, it has been found that anti-rotation protrusions or nubs result in inconsistent torque resistance of the fastener and panel assembly. This may be due to collapsing deformation of the nubs, the stress risers described above, thinning of the panel or incomplete deformation of the panel into the spaces between the nubs or protursions. As the nubs are driven into the panel, the wall thickness of the panel is reduced, resulting in cracks or stress risers. The fastener may loosen in assembly or during use under dynamic loads, particularly vibration. In an attempt to overcome the above-mentioned problems associated with anti-rotation nuts, channels have recently been used as anti-rotation means in nut-type fasteners.

The problem of providing secure anti-rotation means for self-riveting and self-piercing and riveting stud fasteners of the type described above remains, particularly in mass production applications of such fasteners where a nut fastener is driven onto the riveted fastener with a pneumatic driver. This problem has not been solved with torque resistance nubs or protrusions and therefore the need remains for a more secure torque-resistant mechanical interlock between the fastener and the panel.

SUMMARY OF THE INVENTION

As described above, the self-riveting or self-piercing and riveting fasteners having improved panel assembly torque resistance of this invention preferably include a tubular riveting barrel portion having a free end and a body portion having a diameter greater than the barrel portion. The body portion has side walls and a surface which extends radially between said barrel portion and said body side walls. The tubular barrel portion is adapted to be received through an opening in a panel for riveting to the panel. As described in the above-referenced United States patents assigned to the assignee of this application, the free end of the barrel portion may include a piercing surface. When the free end of the barrel portion of the self-piercing fastener is driven against the panel, the piercing surface at the free end of the barrel portion pierces a slug from the panel and the barrel portion is then driven through the pierced panel opening. The riveting fastener having improved panel assembly torque resistance of this invention may, however, also be used with panels having pre-pierced panel openings. The panel opening preferably has a diameter substantially equal to or less than the outside diameter of the barrel portion. The body portion is then driven into the panel adjacent the panel opening. In the most preferred embodiments, the body portion of the fastener is driven into the panel to be substantially flush with the panel.

The improved torque resistance is provided by a plurality of spaced pockets in the radially extending surface of said body portion. Each pocket is defined by pocket walls within the body, the walls extend axially towards and intersect the radial surface of the body, and the pocket walls generally diverge radially towards and intersect the body side walls. The intersection of the pocket walls with said body side walls and radial surface define a pocket opening. In riveting the fastener to the panel, panel material is permanently deformed in the cavities, forming a mechanical interlock between the body portion and the panel resisting rotation of the riveting fastener relative to the panel. The anti-rotation pockets are preferably arcuate, and in a preferred embodiment, the pockets are generally semi-cylindrical and spaced generally equally about the body portion. The inside surface of the arcuate pockets are preferably angled inwardly toward the longitudinal axis of the tubular barrel portion at the free end, thereby channelling panel material into the anti-rotation cavities and substantially filling the pockets to form a very secure mechanical interlock between the body portion and the panel. In a most preferred embodiment, the pockets are semi-conical.

In one preferred embodiment, the riveting fastener body portion includes a radial flange portion integrally joined to the tubular barrel portion opposite the barrel portion free end. The flange extends radially from the tubular barrel portion and includes an outer peripheral surface adjacent the panel portion which is driven into the panel adjacent the panel opening, as described. In this embodiment, the anti-rotation pockets are defined in and spaced around this peripheral surface. Each pocket opens radially outwardly and intersects the body side walls. When the flange portion is driven into the panel, panel material is permanently deformed into the pockets in the flange portion, forming the preferred mechanical interlock.

The anti-rotation cavities or pockets in the body portion of the riveting fasteners of this invention, as described, provide a surprising improvement in torque resistance over the anti-rotation protrusions or nubs used previously. In a 8 mm "PIERCEFORM" stud, for example, it has been found that the anti-rotation cavities or pockets of this invention result in such an improvement that the stud will be twisted off the flange portion before the body portion rotates in the panel. Thus, riveting fasteners having improved panel assembly torque resistance of this invention, and the resultant panel assembly solves the resistance torque problems associated with the prior art, particularly in mass production applications such as automotive applications. Other advantages and meritorious features of the present invention will be more fully understood from the following description of the preferred embodiments, the claims, and the drawings, a brief description of which follows.

BRIEF DESCRIPTION OF THE DRAWINGS

FIG. 1 is a bottom perspective view of one embodiment of the riveting fastener with improved torque resistance of this invention in the form of a self-piercing riveting stud-type fastener;

FIG. 2 is a bottom view of the riveting fastener shown in FIG. 1;

FIG. 3 is a partially cross-sectioned side view of FIG. 2, in the direction of view arrows 3—3;

FIG. 4 is a partially cross-sectioned side view of the fastener, as shown in FIG. 3, with the fastener oriented in an installation apparatus for assembly to a panel;

DESCRIPTION OF THE PREFERRED EMBODIMENTS OF THE INVENTION

Figure 6:
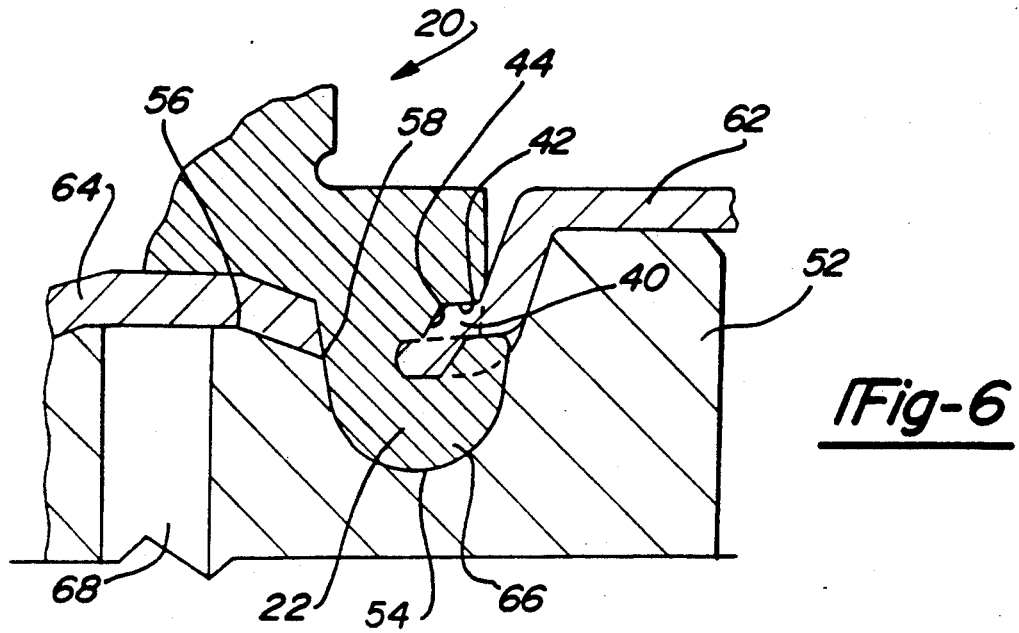
FIG. 6 is a cross-sectional side view of the installed riveting fastener shown in FIG. 5, in the direction of view arrows 6—6.
Figure 5:
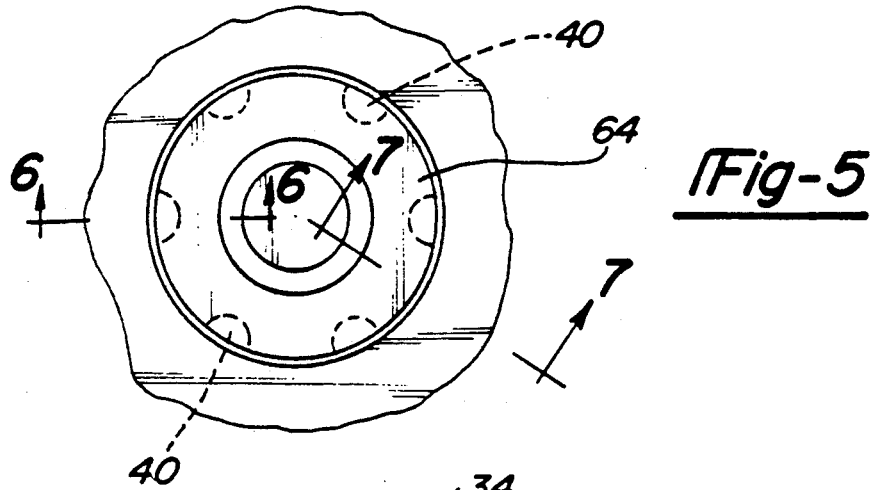
FIG. 5 is a top view of the embodiment of the riveting fastener shown in FIGS. 1-4 with the riveting fastener installed in a panel.

As described above, the riveting fastener with improved torque resistance and panel assembly of this invention is particularly suitable for mass production applications, including automotive applications. The riveting fastener may be installed in a pre-pierced or pre-formed panel opening, or the fastener may be a self-piercing and riveting fastener wherein the fastener pierces an opening in the panel, and the riveting fastener is installed through the pierced panel opening. A self-piercing riveting stud-type fastener having improved torque resistance is disclosed herein. Self-piercing and riveting fasteners of the type disclosed in the above-referenced United States patents are assigned to the assignee of the present application. It will be understood, however, that improvements in torque resistance may be achieved with other riveting fasteners in other applications utilizing the improvements disclosed herein.

FIGS. 1-3 illustrate a self-piercing and riveting stud fastener of the type disclosed in U.S. Pat. Nos. 4,555,838, 4,633,560 and 4,765,057 assigned to the assignee of this application. The riveting fastener 20 includes a tubular barrel portion 22 having a free end 24 including a piercing surface 26 and an arcuate outer driving surface 27. In the disclosed embodiment, the tubular barrel portion 22 is cylindrical; however, the barrel portion may have other configurations including a polygonal configuration, depending upon the application. Further, the configuration of the free end 24 of the barrel portion will depend upon the application of the riveting fastener. For example, a piercing surface will not be required where the riveting fastener is installed in a pre-pierced or pre-formed opening.

In the disclosed embodiment, the barrel portion 22 is integrally joined to a radial flange portion 28 which forms the body 29 portion of the riveting fastener. Flange portion 28 is comprised of a first radial surface (or pressing surface) 38, body (or flange) side wall 39 and second radial (or annular) surface 46. In the disclosed embodiment, the flange portion 28 bridges the end of the barrel portion 22 opposite the free end 24 forming a bottom wall 30 and defining a socket 31 opening through the free end of the barrel portion. In the preferred embodiment of the riveting stud fastener, the bottom surface 32 of the socket 31 is concave and generally conical, as shown. As used herein, top and bottom are relative terms, because the riveting fastener may be installed in a panel in any orientation. Further, where the riveting fastener is installed in a die press, as described above, the installation head may be installed in the upper die platen, wherein the riveting fastener is installed downwardly, or the installation head may be installed in the lower platen, wherein the riveting fastener is installed upwardly in the panel.

The embodiment of the riveting fastener disclosed in FIGS. 1-3 includes an integral stud portion 34, which is externally threaded at 36. As will be understood, however, the configuration of the fastening portion of the riveting fastener will depend upon the application. For example, the riveting fastener of this invention may be utilized as a ball joint, wherein the stud portion may be replaced by a ball member. Other fastening portions are easily adapted, such as an internally threaded nut. These adaptations are all obvious to those skilled in the art and, accordingly, are not shown in the figures.

The preferred embodiment of the riveting fastener of this invention includes a plurality of spaced anti-rotation pockets 40. In the disclosed embodiment, and anti-rotation pockets 40 are defined in the radially extending surface 38 of the flange portion 28, sometimes referred to as the pressing surface. The anti-rotation pockets 40 each include a bottom wall or surface 42 and preferably include an arcuate side surface or wall 44. In a preferred embodiment, the side surface 44 is generally semi-cylindrical defining a semicircular opening to the anti-rotation pockets 40 that has an area which is greater than the inside surface area of the pockets 40. Further, in the most preferred embodiment, the inside surface is preferably semi-conical having an inward angle toward the free end 24 of the barrel portion to define a draft angle. This configuration promotes the flow of panel material into the anti-rotation pockets and substantial filling of the pockets, as now described.

Now referring to the drawing of FIG. 4, as described in the above-referenced U.S. patents of the assignee of the present application, riveting fasteners of the type disclosed herein may be installed in a die press, wherein a riveting fastener or a plurality of riveting fasteners are installed with each cycle of the press. A fastener installation head is attached to one die platen, and a female die member or die button is installed in the opposite die platen. The installation head includes an annular driver or plunger 48 which reciprocates in the installation head (not shown) to install a fastener with each stroke of the press. The riveting fasteners are fed into the installation head into coaxial alignment with the plunger 48. In the disclosed embodiment, the plunger 48 includes an annular free end 50 which engages the annular surface 46 of the flange portion 28 which surrounds the stud portion 34.

The die button 52 includes an annular concave die cavity 54 which surrounds a central die post 56. The free end of the die post in the disclosed embodiment includes a circular peripheral piercing edge 58 which cooperates with the piercing surface 26 of the barrel portion 22 to pierce a slug from the panel, as described below. In the preferred embodiment of the installation apparatus, the die button 52 includes an annular support surface 60 which receives the panel 62. The panel 62 is preferably fixed relative to the die button by a clamping means (not shown) during installation of the riveting fastener 20, particularly a self-piercing and riveting fastener.

As shown in FIG. 4, the barrel portion 22 is coaxially aligned with the concave annular die cavity 54, such that the free end of the die post 56 is received through the open end of the barrel portion, and the plunger 48 is driven toward the panel 62, driving the free end 24 of the barrel portion 22 against the panel.

Figure 7:
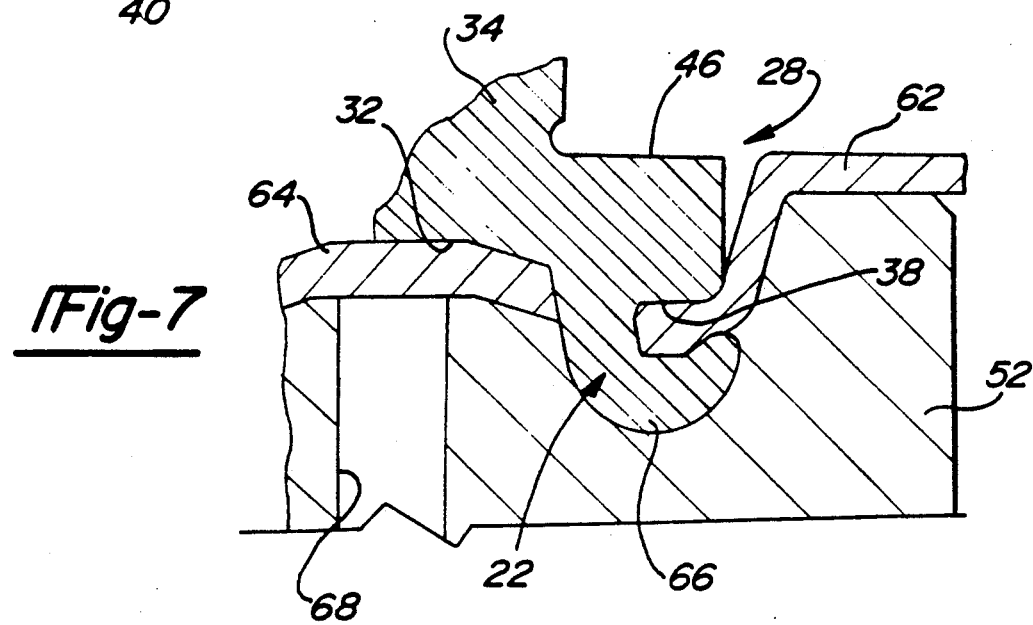
FIG. 7 is a side cross-sectional view of the assembly shown in FIG. 5 in the direction of view arrows 7—7.

Now referring to FIGS. 4, 6 and 7 of the drawings, as described more fully in the above-referenced U.S. Pat. Nos. (i.e., U.S. Pat. No. 4,555,838) the free end of the barrel portion 24 first drives the panel 62 into the die cavity against the free end of the die post 56. The piercing surface 26 of the barrel portion 22 then cooperates with the piercing edge 58 of the die post to pierce a slug 64 from the panel, which is received on the free end of the die post 56. The free end 24 of the barrel portion is then received through the pierced panel opening in the concave annular die cavity 54 which deforms the barrel portion 24 radially outwardly, forming a U-shaped channel 66. The panel adjacent the pierced panel opening is simultaneously driven into the developing U-shaped channel 66, forming a very secure mechanical interlock between the barrel portion 22 and the panel 62, as shown in FIGS. 6 and 7. In the disclosed embodiment, the die post includes an axial bore 68 which provides a pressure relief passage, removing air entrapped in the socket 31 as the stud is attached to the panel.

As disclosed particularly in FIGS. 6 and 7, the pressing surface 38 of the flange portion 28 is driven into the panel 62 as the barrel portion 22 is deformed radially outwardly. The panel is simultaneously deformed into the anti-rotation pockets 40, as shown in FIG. 6. In the preferred embodiment, the inclined arcuate surfaces 44 of the anti-rotation pockets 40 channels the panel material into the pockets 40, substantially filling the pockets 40 without reducing the wall thickness of the panel in the pockets 40. As shown in FIG. 6, the panel is deformed into the pockets 40, against the bottom and inside surfaces 42 and 44, respectively, substantially filling the pockets 40 to provide optimum torque resistance. It is important to note that pockets 40 are preferably formed from an inner surface 44 and a bottom surface 42. Surface 44 can generally be defined as a semiconical surface which diverges as it approaches said pocket opening as it is viewed from a radial projection. In a preferred embodiment, inner surface 44 diverges as it approaches said pocket opening when it is viewed from a projection taken along the barrel axis. Configuring surface 44 to diverge as it approaches the pocket opening along two projections (radial and axial) generally promotes the flow of panel 62 into said pocket 40 and against said inside surface 44.

The design of pockets 40 is carefully engineered to provide maximum anti-rotation resistance. For example, if flange 28 were fashioned with a channel (not shown) which ran from pressing surface 38, through flange 28 and to annular surface 46, there would be no bottom surface 42 to block the axial movement of panel 62 as it is driven into pockets 40 by barrel 24 when barrel 24 is radially deformed. With bottom surface 42 present, panel 62 is pushed axially until it contacts bottom surface 42. If panel 62 is pushed by radially deforming barrel 24, then after panel 62 contacts bottom surface 42, panel 62 will move along bottom surface 42 and toward inside surface 44. Because the rotation resistance of fastener 20 is, in part, a function of how much of panel 62 contacts inside surface 44, the rotation resistance of fastener 20 is related to how efficient bottom surface 42 is at redirecting the axial movement of panel 62 against surface 44. By efficiently channeling panel 62 against surface 44, secure contact between inside surface 44 and panel 62 is obtained, thereby maximizing the anti-rotation capability of fastener 20.

The number of anti-rotation pockets in the flange portion 28 of the riveting stud fastener of FIGS. 1-7 will depend upon the torque requirements of the assembly. The anti-rotation pockets 40 are preferably equally spaced around the periphery of the pressing surface 38 for optimum torque resistance. It has been found, for example, that six to ten anti-rotation pockets 40 may be required in certain applications. The anti-rotation pockets 40 preferably define a relative small percentage of the area of the pressing surface 38, assuring complete filling of the pockets 40 during installation. The semicircular configuration of the pockets 40 has been found to be particularly effective in providing improved torque resistance.

In an 8 mm stud, for example, installed in a panel having a thickness of 0.030 inches, the anti-rotation pockets 40 provided an improvement of 250% in torque resistance over the same number of barbs or protrusions. An improvement in torque resistance of 185% was found in a similar installation in panels having a thickness of 0.100 inches. This improvement in torque resistance was unexpected, but particularly important in automotive installations. The improvement in torque resistance was achieved without reducing the structural integrity of the joint and eliminated stress risers or cracks sometimes formed with barbs or protrusions, as described above. The improvement in torque resistance is particularly important with installations in relatively thin panels having a thickness of 0.030 inches or less, where torque resistance is less under normal installations. As described, the anti-rotation pockets 40 are preferably relatively small to assure complete filling of the pockets 40 with panel material during installation. In the installations described above, the bottom surface 42 of the anti-rotation pockets 40 had a radius of about 1.0 mm and a top radius of about 1.3 mm. The inside surface 44 was angled inwardly relative to the axis of the barrel portion at an angle of about 23 degrees. This configuration assured complete filling of the pockets 40 to provide an unexpected improvement in torque resistance in automotive applications of the type described below.

Having described the preferred embodiments of the riveting fastener having improved torque resistance and the fastener and panel assembly, it will be understood that various modifications may be made to the riveting fastener and assembly within the purview of the appended claims. The dimensions of the riveting fasteners will depend upon the particular application and panel thickness. As described above, however, the riveting fastener of this invention is particularly adapted for permanent attachment to relatively thin panels, such as utilized for body and structural components in the automotive and appliance industries. Torque resistance is a particular problem for riveting fasteners installed in relatively thin panels having a thickness of 0.040 inches or less, although the riveting fastener having improved torque resistance and panel assembly of this invention may be utilized in thicker panels having a thickness of 0.125 inches or greater. The self-riveting fastener is preferably formed of a deformable metal, preferably steel, which may be heat-treated for surface hardness, ductility, etc. As used herein, "panel" refers to any plate, panel or metal sheet having a thickness thin enough for deformation into the anti-rotation pockets to achieve improved torque resistance, as described. A suitable material for the riveting fasteners of this invention is typically medium carbon steels, including SAE 1022, 1023 and 1030 steels. Where the riveting fastener is utilized as a self-piercing and riveting fastener, the fastener must be harder than the panel. Reference may also be made to the above-referenced U.S. Pat. Nos. for further information regarding suitable installation apparatus and methods of installation.

I claim:

1. A riveting fastener having improved panel assembly torque resistance, said riveting fastener including a tubular riveting barrel portion having a free end and a body portion having a diameter greater than said barrel portion, said body portion having a side wall and a continuous surface extending radially between said barrel portion and said body portion side wall, said tubular barrel portion adapted to be received through an opening in a panel for riveting said barrel portion of said panel and said body portion adapted to be driven into said panel adjacent said panel opening deforming said panel, the improvement comprising:

torque resistance means on said body portion thereby preventing relative rotation of said riveting fastener in said panel, said torque resistance means comprising a plurality of spaced pockets in said body portion, each one of said pockets defined by pocket walls within said body, said pocket walls extending axially towards and intersecting said radial surface of said body portion and said pocket walls generally diverging radially toward and intersecting said body side walls, said intersection of said pocket walls with said body side walls and radial surface defining a pocket opening which channels panel material into said pockets as said body portion is driven into said panel forming a mechanical interlock between said body portion and said panel resisting rotation of said riveting fastener relative to said panel.

2. The riveting fastener having improved panel assembly torque resistance defined in claim 1, characterized in that said pocket walls in said body portion include side walls and a floor wall, wherein said pocket side walls are generally arcuate and spaced evenly around said body portion.

3. The riveting fastener having improved panel assembly torque resistance defined in claim 2, characterized in that said pocket side walls obtusely angle inwardly forming a semi-conical surface.

4. The riveting fastener having improved panel assembly torque resistance defined in claim 3, wherein said pocket floor wall is generally parallel to said radially extending surface.

5. A riveting fastener having improved panel assembly torque resistance, said riveting fastener including a tubular riveting barrel portion having a free end, and a body portion having a diameter greater than said barrel portion, said body portion having a side wall and a first continuous radial surface extending between said barrel portion and said body side wall, said tubular barrel portion adapted to be received through an opening in a panel for riveting to said panel and said body portion adapted to be driven into said panel adjacent said panel opening deforming said panel, the improvement comprising:

a plurality of spaced pockets in said body portion, said pockets defined by pocket walls within said body portion, said pockets each having an arcuate inside surface diverging radially outwardly toward and intersecting said body portion side wall and extending axially toward and intersecting said radial surface of said body portion, said intersection of said pocket walls with said body portion side wall and radial surface defining a pocket opening for receiving said panel which is deformed into said pockets as said body portion is driven into said panel forming a mechanical interlock between said body portion and said panel resisting rotation of said riveting fastener relative to said panel.

6. The riveting fastener having improved panel assembly torque resistance defined in claim 5, characterized in that said inside surface of said pockets is generally semi-cylindrical and spaced evenly around said body portion.

7. The riveting fastener having improved panel assembly torque resistance defined in claim 5, characterized in that said body portion includes a second radial surface spaced apart from said first radial surface, said second radial surface intersecting said body side wall, said first and second radial surfaces and said body side wall forming a radial flange portion integrally joined to said tubular barrel portion opposite said free end.

8. The riveting fastener having improved panel assembly torque resistance defined in claim 7, wherein said inside surface of said pockets is generally semi-conical.

9. The riveting fastener having improved panel assembly torque resistance defined in claim 8, characterized in that said inside surface of said pockets are angled inwardly in said body portion toward the longitudinal axis of said tubular barrel portion at said free end.

10. The riveting fastener having improved panel assembly torque resistance defined in claim 7, characterized in that said first radial surface of said flange portion defines a pressing surface extending radially outwardly generally perpendicular to the longitudinal axis of said barrel portion.

11. A riveting fastener and panel assembly having improved torque resistance, comprising:

a riveting fastener including a tubular riveting barrel portion having a free end and a body portion having a diameter greater than said barrel portion, said body portion having a side wall and a first continuous radial surface extending radially between said barrel portion and said body side wall, said panel having an opening, said tubular barrel portion received through said panel opening and said barrel portion free end permanently deformable radially outwardly to engagement with one surface of said panel, said body portion driven into said panel opposite said barrel portion free end to deform said panel, said riveting fastener body portion having a plurality of spaced pockets, each one of said pockets defined by pocket walls within said body portion, said walls extending axially toward and intersecting said first radial surface of said body portion and said pocket walls generally diverging radially toward and intersecting said body portion side wall, said intersection of said pocket walls with said body portion side wall and radial surface defining a pocket opening for receiving said panel adjacent said pocket opening, whereby said panel is permanently deformed into said body portion pockets substantially filling said pockets, without materially reducing the wall thickness of said panel, forming a mechanical interlock between said body portion and said panel resisting rotation of said riveting fastener relative to said panel.

12. The riveting fastener and panel assembly having improved torque resistance as defined in claim 11, wherein said pocket walls are comprised of a side wall and a bottom wall, said pocket side wall having an arcuate surface, and wherein the axial projection of said pocket opening comprises an area greater than the area of said bottom wall, whereby said panel material is channeled into said pockets as said body portion is driven into said panel, thereby forming said mechanical interlock.

13. The riveting fastener and panel assembly having improved torque resistance as defined in claim 11, characterized in that said pocket side walls are semi-conical and said pockets are spaced generally equally about the periphery of said first radial surface.

14. The riveting fastener and panel assembly having improved torque resistance as defined in claim 11, characterized in that said body portion includes a second radial surface spaced from said first radial surface, said second radial surface intersecting said body portion side wall, said first and second radial surface and said body portion side wall defining a radial flange portion integrally joined to said tubular barrel portion opposite said free end, said radial flange portion extending radially from said tubular barrel portion opposite said free end, said flange adapted to be driven into said panel with said second radial surface generally flush with said panel, said outer periphery of said first radial surface including said plurality of spaced pockets.

15. The riveting fastener and panel assembly having improved torque resistance as defined in claim 14, characterized in that said pocket side walls are semi-conical and open radially outwardly and intersect said body portion side wall, said intersection forming an opening into said pocket, said opening shaped like a trapezoid when viewed along a radial axis.

16. The riveting fastener and panel assembly having improved torque resistance as defined in claim 15, characterized in that said semi-conical side walls obtusely angle inwardly into said body portion.

17. The riveting fastener and panel assembly having improved torque resistance as defined in claim 14, characterized in that said first raidal surface of said flanged portion defines a pressing surface adjacent said tubular barrel portion extending radially outwardly and generally perpendicular to the longitudinal axis of said barrel portion.

* * * * *